(12) United States Patent
Carr

(10) Patent No.: US 7,797,550 B2
(45) Date of Patent: Sep. 14, 2010

(54) SYSTEM AND METHOD FOR SECURELY BUFFERING CONTENT

(75) Inventor: Jeffrey Douglas Carr, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 2015 days.

(21) Appl. No.: 10/310,075

(22) Filed: Dec. 4, 2002

(65) Prior Publication Data

US 2004/0060060 A1   Mar. 25, 2004

Related U.S. Application Data

(60) Provisional application No. 60/413,871, filed on Sep. 25, 2002, provisional application No. 60/419,474, filed on Oct. 18, 2002.

(51) Int. Cl.
*G06F 12/14* (2006.01)
*G06F 1/26* (2006.01)
*H04N 7/167* (2006.01)

(52) U.S. Cl. ............... 713/189; 713/154; 713/160; 713/165; 713/171; 713/193; 713/194; 726/2; 726/3; 726/26; 726/30; 726/32; 726/34; 380/201; 380/203; 380/210; 380/217; 380/239; 380/277; 380/278; 711/100

(58) Field of Classification Search ............ 713/182, 713/189, 193
See application file for complete search history.

(56) References Cited

U.S. PATENT DOCUMENTS 5,363,264 A * 11/1994 Cavanaugh et al. ......... 386/110
5,392,396 A * 2/1995 MacInnis ................. 345/543
5,619,445 A * 4/1997 Hyatt ..................... 365/45
5,825,879 A * 10/1998 Davis ..................... 380/216
2001/0018745 A1* 8/2001 Laczko et al. ............. 713/200
2002/0037039 A1* 3/2002 Sugahara ............... 375/240.01
2002/0090087 A1* 7/2002 Tamura et al. ............. 380/210
2002/0106082 A1* 8/2002 Kori et al. ................ 380/202
2002/0194253 A1* 12/2002 Cooper et al. ............. 709/200
2003/0215211 A1* 11/2003 Coffin, III ................ 386/46
2003/0226011 A1* 12/2003 Kuwano et al. ............ 713/155
2004/0111613 A1* 6/2004 Shen-Orr et al. .......... 713/165
2005/0044175 A1* 2/2005 Cheung .................. 709/217

FOREIGN PATENT DOCUMENTS

EP   1187477   3/2002

(Continued)

OTHER PUBLICATIONS

El-Henaoui et al, Traffic Parameter Control for MPEG Video Traffic in ATM Networks, 1997, IEEE, pp. 490-494.*

(Continued)

*Primary Examiner*—Edan Orgad
*Assistant Examiner*—Jenise E Jackson
(74) *Attorney, Agent, or Firm*—McAndrews, Held & Malloy, Ltd.

(57) ABSTRACT

Systems and methods that securely buffer content are provided. In one embodiment, a system may include, for example, a processor and a memory. The memory may be coupled to the processor. Before content leaves the processor for the memory, the processor may secure the content. After the secured content enters the processor from the memory, the processor may recover the content from the secured content.

29 Claims, 6 Drawing Sheets

FOREIGN PATENT DOCUMENTS

| EP | 1202150 | 5/2002 |
| GB | 2354392 | 3/2001 |
| WO | WO 01/67756 | 9/2001 |

OTHER PUBLICATIONS

P.J. Lenior, "Functional Model for the DVB CPCM Framework," Royal Philips Electronics Presentation, Feb. 2002.
Rowan Vevers, "DVB Sub-Group on Commercial Requirements for Copy Protection Systems Report to the Eighteenth Meeting of the DVB Commercial Module (DVB-CM)," DVB Report, DVB-CP8(00)7, Oct. 2000.
Jeff Carr, "Response to DVB Call for Information Copy Protection and Digital Rights Management Technologies," Broadcom Corp., Oct. 2001.
"Call for Proposals for Content Protection & Copy Management Technologies," DVB, DVB Technical Module Sub-Group on Copy Protection Technologies, DVB CPT rev 1.2, Jul. 2001.
Ji et al., "Open Letter following Proposal DVB-CPY-719," Feb. 2002.
"SCTE Proposed Standard Head-end Implementation of OpenCAS™," Society of Cable Telecommunications Engineers, Inc., Engineering Committee, Digital Video Subcommittee, SCTE DVS 278r1, Jul. 2000.
"Data-Over-Cable Interface Specification," MCNS Holdings, L.P., Security Systems Specification, SP-SSI-I01-970506, 1997.
"DES CBC Packet Encryption," General Instrument Corp., SCTE DVS/042, Nov. 1996.
"CD-Rom Based Application Software Consumer and SOHO Copying Trends," Merrill Research Associates, Apr. 2000.
"White Paper—The Ins and Outs of Content Delivery Networks," Stardust.com inc., Dec. 2000.
"CD-Rom Unauthorized Copying Study Executive Summary," Merrill Research Associates, Apr. 1999.
"UDAC-M Host Link Specification, Part 1: Overview," Keitaide-Music Consortium, Ver. 0.9, Dec. 2000.
"Keitaide-Music Technical Specification Part I Overview," Keitaide-Music Consortium, Ver. 1.0, Dec. 2000.
"EPRS8 White Paper," SecureMedia, Inc., 2000.
William Raike "Detailed Supplemental Technical Description of the RPK Public-Key Cryptographic System," 1996.
Joseph M. Winograd, "Audio Watermarking Technologies for Protection of Digital Audio and Video—Presentation to DVD CPTWG," Verance Corporation, Sep. 2000.
John Paddleford, "Digital Rights Management—Protecting Your Content," Microsoft Corporation, undated.
"Common Interface Specification for Conditional Access and Other Digital Video Broadcasting Decoder Applications," DVB, DVB Document A017, May 1996.
"Call for Proposals for Content Protection & Copy Management Technologies," DVD, DVB Technical Module Sub-Group on Copy Protection Technologies, Rev. 1.2, Jul. 2001.
Bechtolsheim et al., "Responses to DVB-CP Requirements (DVB-CM283) for the OCCAM Open Conditional Content Access Management System," Cisco Systems, Inc. Oct. 2001.
"NetDRM Technology Response to DVD Call for Proposals for Content Protection & Copy Management Technologies," DVD, Matsushita Electric Industrial Co., Ltd., Oct. 2001.
"Proposal for Content Protection & Copy Management Technologies submitted to DVB (Digital Video Broadcasting," Veridian, Oct. 2001.
"Response to the DVB-CPT Call for Proposals for Content Protection & Copy Management Technologies," Royal Phillips Electronics N.V., Oct. 2001.
Kish et al., "An Information Paper in Response to the Call for Proposals Issued by the DVB Copy Protection Technologies Sub-Group of the DVB Technical Module," VWM Companies, Oct. 2001.
"Proposals for Content Protection and Copy Management Technologies," Sony International (Europe), Oct. 2001.
Olsthoorn et al., "Flexcop—A Flexible Copy Protection Framework," Flexcop, undated.
"Proposals for DVB Content Protection & Copy Management Technologies," Nokia, Version 1.0, Oct. 2001.
"4C Entity Response to DVB CPT Call for Proposals Regarding Content Protection & Copy Management Technologies—Content Protection System Architecture—A Comprehensive Framework for Content Protection, with CPPM and CPRM Technologies," 4C Entity, LLC, Oct. 2001.
"SmartRight Answer to the Call for Proposals for Content Protection & Copy Management Technologies," THOMSON Multimedia et al., Oct. 2001.
"Answer to Call for Proposals for Content Protection & Copy Management Technologies," Thales Communication, Oct. 2001.
"IBM Response to DVB CPT Call for Proposals Regarding Content Protection & Copy Management: xCP Cluster Protocol," IBM, Oct. 2001.
"Digital Transmission Licensing Administrator's (DTLA) Response to DVB-CPT Call for Proposals Concerning Content Protection & Copy Management Technologies Protected Transport of Commercial Entertainment Content Using DTCP Technology," DTLA, 2001.
Winograd et al., "Audio Watermarking System for Content Protection within a DVB CPCM Environment," Verance Corporation, Oct. 2001.
"Proposed Baseline DVB-CPCM Response to DVB-CPT Call for Proposal Concerning Content Protection & Copy Technologies," Matsushita Electric Industrial Co., Ltd., Oct. 2001.
"Response to the Call for Proposals Content Protection and Copy Management Technologies by DVB Copy Protection Technologies Sub-Group of DVB Technical Module," Pioneer Corporation, Oct. 2001.
Kudumais, et al., "OPIMA/OCCAMM: A Solution to DVB Call for Proposals for Content Protection & Copy Management Technologies," OCCAMM, undated.
Capitant et al., "Digital Rights Management & Copy Protection An Information Paper in Response to the Call for Proposals Issued by the DVB Copy Technologies Sub-Group of the DVB Technical Module," Macrovision Corporation and Widevine Technologies Oct. 2001.
"Content Protection System Architecture A Comprehensive Framework for Content Protection, with High-Bandwidth Digital Content Protection (HDCP) Technology," Digital Content Protection, LLC, Oct. 2001.
"Digimarc Response to DVB_CPCM CFP: Watermarking Applications Information Paper," Digimarc Corporation, Oct. 2001.
Agnelli et al., "LAN Interconnection Via ATM Satellite Links for CAD Applications: The UNOM Experiments," undated.
Löytänä et al. "Session Management Problems in Narrowband Interactive Services," Ad Hoc Group on Systems for Interactive Services, undated.
"Presentation to the TM," Simulcrypt Technical Group, undated.
"The DVB Project Promotion and Communication Module," DVB Project Office, Digital Video Broadcasting Presentation, undated.
"Digital Video Broadcasting (DVB); Support for Use of Scrambling and Digital Broadcasting Systems," European Telecommunications Standards Institute, ETSI Technical Report ETR 289, Oct. 1996.
"Digital Video Broadcasting (DVB); DVB SimulCrypt; Part 1: Head-end architecture and synchronization," European Telecommunications Standards Institute, ETSI Technical Report TS 101 197-1 v1.1.1 Jun. 1997.
"IPsec Processing," Microsoft Corporation et al, 1998.
"IPsec Databases," Microsoft Corp. Document, undated.
Jeff Carr; Copy Protection and Digital Rights Management Technologies; Oct. 18, 2001; pp. 1-13.

* cited by examiner

SYSTEM AND METHOD FOR SECURELY BUFFERING CONTENT

RELATED APPLICATIONS

This application makes reference to, claims priority to and claims benefit from U.S. Provisional Patent Application Ser. No. 60/413,871, entitled "System and Method for Securely Buffering Content" and filed on Sep. 25, 2002; and U.S. Provisional Patent Application Ser. No. 60/419,474, entitled "System and Method for Securely Buffering Content" and filed on Oct. 18, 2002.

INCORPORATION BY REFERENCE

The above-referenced United States patent applications are hereby incorporated herein by reference in their entirety.

BACKGROUND OF THE INVENTION

When digitally processing content (e.g., encoding or decoding), memory may be used for buffering, for example, intermediate results of a processing stage or for storing data as it is passed from one processing stage to another. Although content can be secured within a processing chip during a particular process stage, the content is still vulnerable, for example, while being written to, read from or held in a memory buffer.

FIG. 1 shows a block diagram illustrating an example of a system in which content is not secured. The system 10 may include, for example, a signal processing unit 30 coupled to an external memory storage device 40 (e.g., a hard drive). The signal processing unit 30 may be part of a set top box 20 that, for example, receives audio and visual content over multiple channels. The signal processing unit 30 is coupled to the external memory storage device 40 via a connection 70. The signal processing unit 30 is also coupled to a connection 50 and to a connection 60. Incoming content is typically encrypted when placed on the connection 50 from a central content provider (not shown) to the subscriber. The encrypted content is then decrypted, decoded or otherwise processed by the signal processing unit 30. In processing (e.g., decrypting, decoding, etc.) the incoming content, the signal processing unit 30 uses the external memory storage device 40, for example, for reading and writing content information, for buffering content information during intermediate stages of processing, etc. When the signal processing unit 30 finishes processing the incoming content, the system 10 outputs the desired output content (e.g., audio/visual content for a channel for which access has been authorized) on the connection 60 to another device (e.g., a display device).

However, once the incoming content has been decrypted by the signal processing unit 30, the content can become unsecured when stored in the external memory storage device 40 or when sent or received on the connection 70 between the signal processing unit 30 and the external memory storage device 40. Thus, unencrypted content may be accessed or copied by accessing the external memory storage device 40 or by tapping the connection 70 between the signal processing unit 20 and the external memory storage device 40. Such unsecured content may then be rebroadcasted, retransmitted or copied for delivery to an unintended or unauthorized audience.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found in, for example, systems and methods that securely buffer content. In one embodiment, the present invention may provide a system that securely buffers content. The system may include, for example, a processor and a memory. The memory may be coupled to the processor. Before content leaves the processor for the memory, the processor may secure the content. After the secured content enters the processor from the memory, the processor may recover the content from the secured content.

In another embodiment, the present invention may provide a method that securely buffers content. The method may include one or more of the following: applying a particular security scheme to protect content before leaving a signal processor for a storage device; and recovering the content from the protected content after the protected content enters the signal processor from the storage device.

In yet another embodiment, the present invention may provide a method that securely buffers content. The method may include one or more of the following: decrypting content received by a first processor of a signal processor, the decrypting being performed by a first device adapted to decrypt a first kind of encryption; encrypting the content sent from the first processor to a memory before the content leaves the signal processor, the encrypting being performed by a second device adapted to perform a second kind of encryption; and decrypting the content received by a second processor of the signal processor from the memory after the content is received by the signal processor, the decrypting being performed by a third device adapted to decrypt the second kind of encryption.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
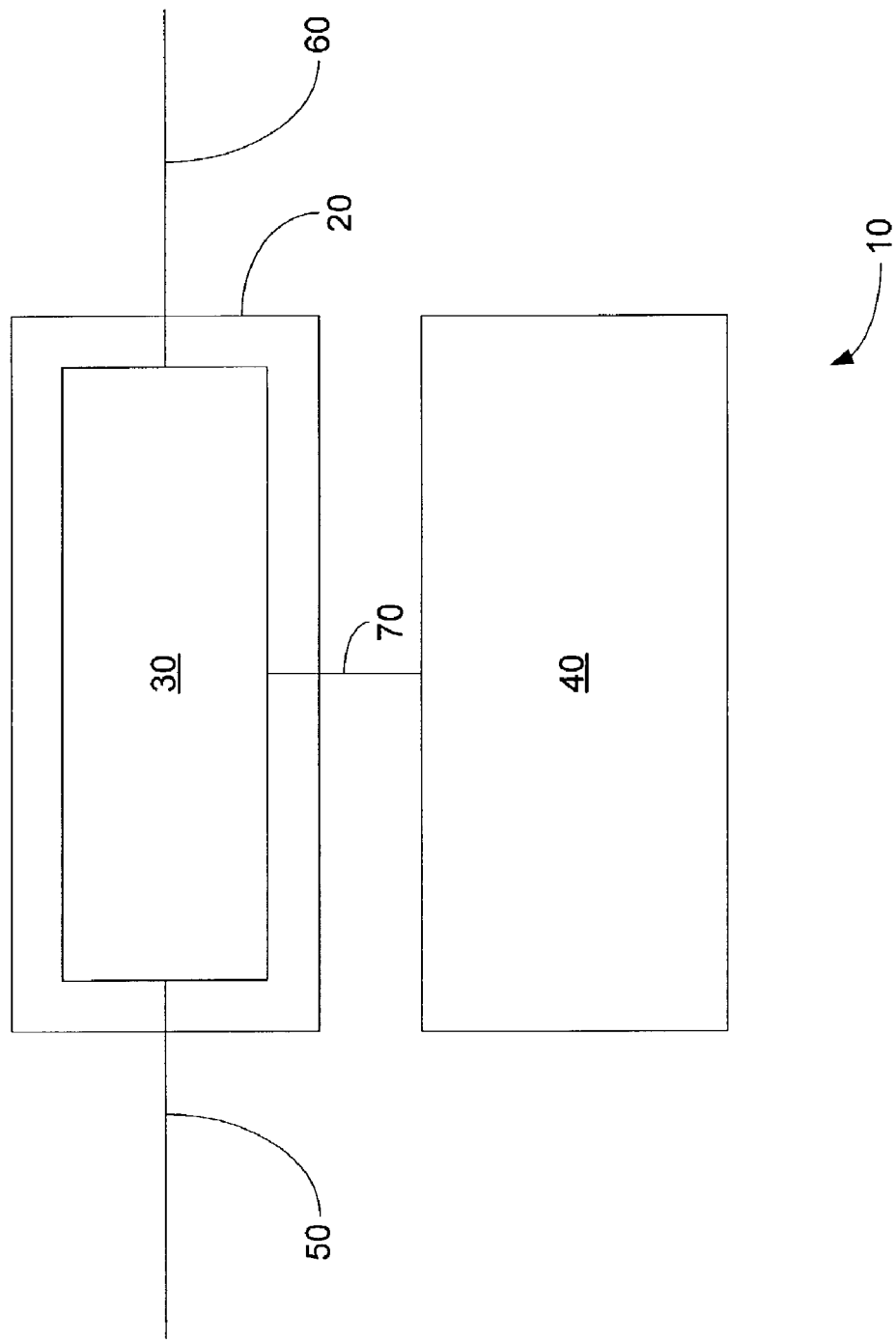
FIG. 1 shows a block diagram illustrating an example of a system in which content is not secured.
Figure 2:
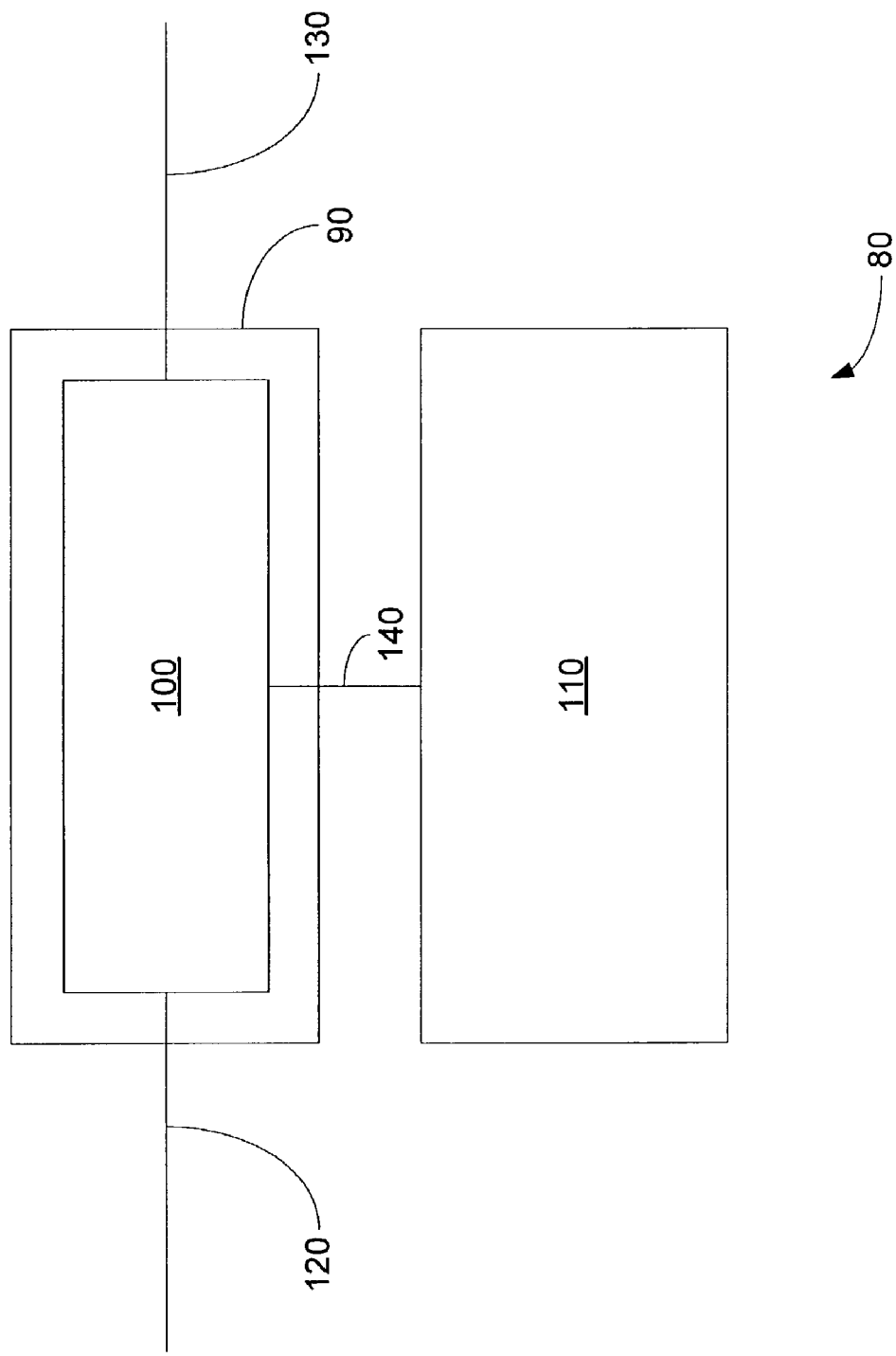
FIG. 2 shows a block diagram illustrating an embodiment of a system that securely buffers content according to the present invention.

FIG. 2 shows a block diagram illustrating an embodiment of a system that securely buffers content according to the present invention. The system 80 may include, for example, a signal processing unit 100 and a storage device 110. The signal processing unit 100 may be part of a set top box 90 that, for example, receives audio and visual content over multiple channels. The signal processing unit 100 may be, for example, an integrated circuit (IC) chip mounted on a motherboard of the set top box 90. However, the present invention need not be limited to set top boxes. The signal processing unit 100 may be adapted to process signals (e.g., decrypting, decoding, etc.) and may include, for example, one or more processing units. The signal processing unit 100 may be coupled to the storage device 110 via a connection 140. The signal processing unit 100 may also be coupled to a connection 120 and to a connection 130. The connections 120, 130, 140 may include, for example, a wire connection, a fiber connection, a cable connection or a wireless connection.

The storage device 110 may include, for example, an electrical storage device, a mechanical storage device, a magnetic storage device, an optical storage device, a storage network or any combination thereof. In an embodiment that employs a set top box, the storage device 110 may also be part of the set top box 90 or may be external to the set top box 90. In one embodiment, the storage device 100 may be part of the set top box, but external to the signal processing unit 100. In another embodiment, the storage device 100 and the signal processing unit 100 may be part of a chip (e.g., an integrated chip). In yet another embodiment, the signal processing unit 100 may include the storage device 110. For example, the signal processing unit 100 may include the storage device 100 and a plurality of processing blocks in which the storage device 100 is external to the plurality of processing blocks, but still part of the signal processing unit 100. The present invention also contemplates other arrangements and configurations of the storage device 100 in, for example, systems and methods that securely buffer content.

Incoming content may typically be encrypted when placed on the connection 120 from a central content provider (not shown) to a subscriber. The encrypted content may then be decrypted, decoded or otherwise processed by the signal processing unit 100. In processing (e.g., decrypting, parsing, filtering, decoding, etc.) the incoming content, the signal processing unit 100 may use the storage device 110, for example, for reading and writing content information, for buffering content information during intermediate stages of processing, etc. When the signal processing unit 100 finishes processing the incoming content, the system 80 may then output the desired content (e.g., audio/visual content for a channel for which access has been authorized) on the connection 130 to another device (e.g., a display device). If the output is an analog signal, then the signal may be sent without security. Alternatively, the resolution of the analog signal may be degraded so as to lower the signal resolution, thereby making it less valuable. In one embodiment, a watermark may be applied to the analog signal. If the output is a digital signal, then digital signal may be secured via encryption (e.g., digital video interface (DVI), 5C or other encryption schemes).

Figure 3:
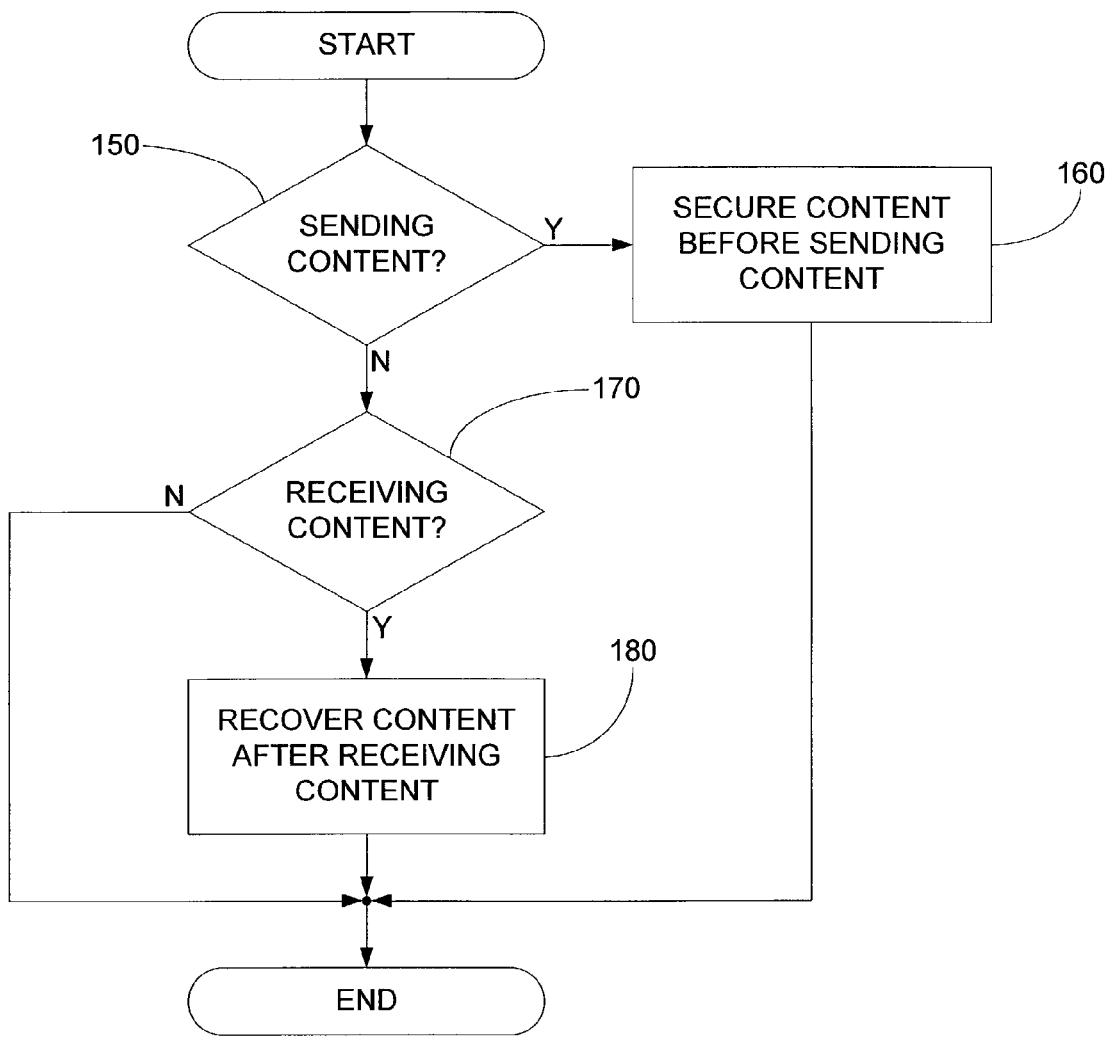
FIG. 3 shows a flow chart illustrating an embodiment of a process that securely buffers content according to the present invention.

FIG. 3 shows a flow chart illustrating an embodiment of a process that securely buffers content according to the present invention. As described above, the signal processing unit 100 may include one or more processing units that may use the storage device 110 when processing content. In query 150, it may be determined whether the signal processing unit 100 is sending content to the storage device 110. If the signal processing unit 100 is sending content to the storage device 110, then the signal processing unit 100 may secure the content before sending the secured content to the storage device 110. The process may then be completed. The signal processing unit 100 may secure the content by, for example, applying a particular type of encryption, applying a particular type of copy protection, degrading the content or using other methods or combinations of methods that secure content. The content may be degraded, for example, by removing a portion of the content, periodically taking out pieces of the content, scrambling portions of the content, encrypting portions of the content or by other processes that degrade the content. In one embodiment, the content may be video content and the content may be degraded by partially or wholly degrading at least some I-frames. The proportion of degradation may be a particular threshold level. The selection of a particular method that may secure content may be based on, for example, the type of content, content rate or from which of the one or more processing units of the signal processing unit 100 the content originates. Thus, for example, content being sent from one kind of processing unit (e.g., a transport processing engine) of the signal processing unit 100 to the storage device 110 may be secured by a first kind of encryption or copy protection while content being sent from another kind of processing unit (e.g., a video/audio decoding engine) of the signal processing unit 100 to the storage device 110 may be secured by a second kind of encryption or copy protection. Furthermore, the content rate of different processing units of the signal processing unit 100 may determine which type of, for example, encryption/decryption schemes may be used. For example, a transport processing engine may have a different content rate than a video/audio decoding engine. Accordingly, an encryption scheme that may be used with slower content rates may be applicable for the transport processing engine, but not with the video/audio decoding engine.

If the signal processing unit 100 is not sending content to the storage device 110, then, in query 170, it may be determined whether the signal processing unit 100 is receiving content from the storage device 110. If the signal processing unit 100 is not receiving content from the storage device 110, then the process may be completed. If the signal processing unit 100 is receiving content from the storage device 110, then, in step 180, the signal processing unit 100 may recover content after receiving the secured content. The process may then be completed. The signal processing unit 100 may recover the content from the received secured content by, for example, decrypting the encrypted content, removing the copy protection from the copy protected content, enhancing the received degraded content or other methods that recover content from the received secured content. In one embodiment, the signal processing unit 100 may apply a particular recovery scheme based upon, for example, the particular processing unit in the signal processing unit 100 that previously handled the content, the type of content, the content rate (e.g., content processing rate) or the particular processing unit in the signal processing unit 100 that is requesting the content.

Figure 4:
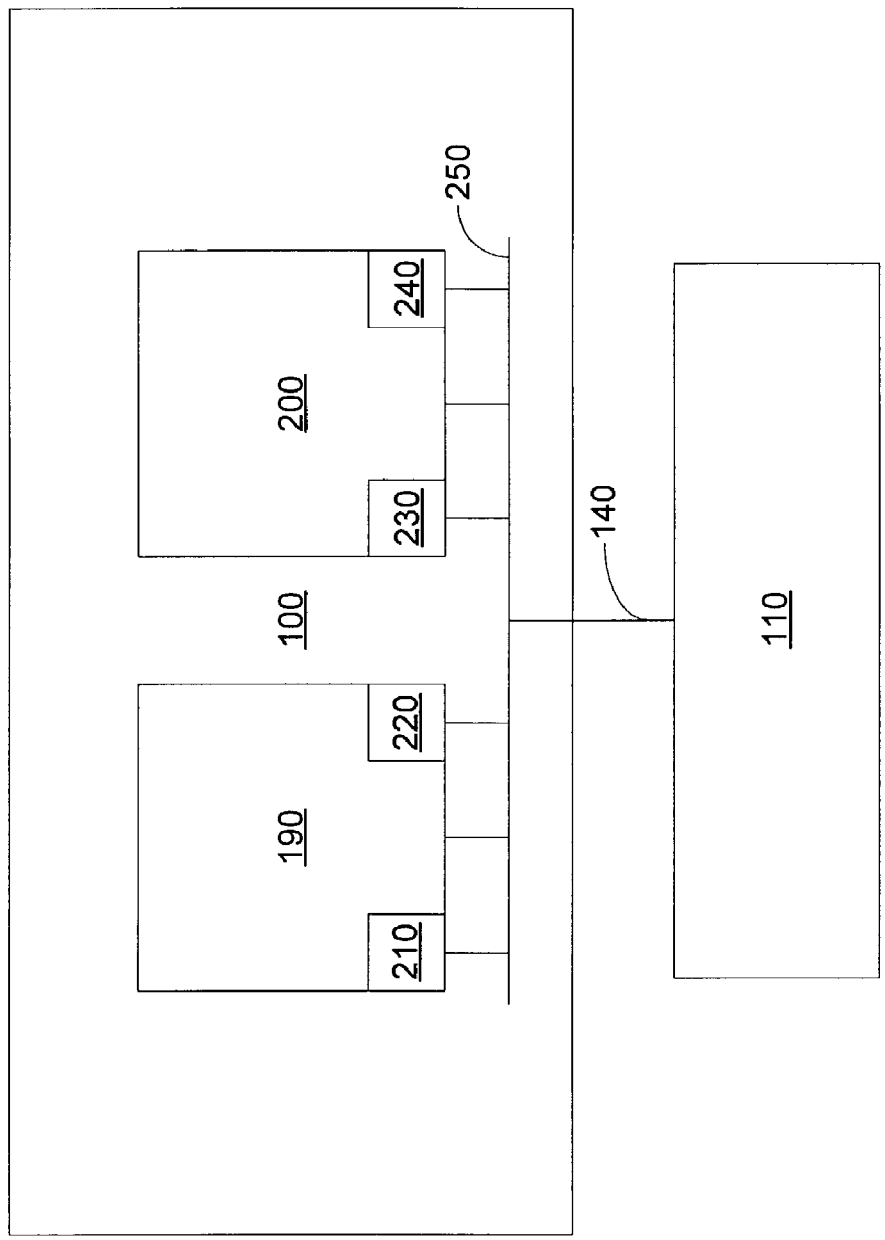
FIG. 4 shows a block diagram illustrating an embodiment of a system that securely buffers content according to the present invention.

FIG. 4 shows a block diagram illustrating an embodiment of a system that securely buffers content according to the present invention. The system may include, for example, the signal processing unit 100 and the storage device 110. Although the storage device 110 is illustrated as being external to the signal processing unit 100, as described above, the present invention also contemplates that signal processing unit 100 may include the storage device 110. The signal processing unit 100 may include, for example, a first processing unit 190 and a second processing unit 200. The first processing unit 190 may be, for example, a data transport engine of a personal video recording (PVR) system. The second processing unit 200 may be, for example, a video and/or an audio decoding engine. Although the present invention may find application with, for example, PVR systems or set top boxes, the present invention need not be so limited. Furthermore, although illustrated with two processing units, the signal processing unit 100 may include more or less than two processing units. The first processing unit 190 may include, for example, a first device 210 that secures content being sent to the storage device 110 and a first device 220 that recovers content from secured content received from the storage device 110. The second processing unit 200 may include, for example, a second device 230 that secures content being sent to the storage device 110 and a second device 240 that recovers content from secured content received from the storage device 110.

The signal processing unit 100 and the storage device 110 may be coupled via the connection 140. The first processing unit 190 may be coupled to a bus 250 which, in turn, may be coupled to the connection 140. The first devices 210, 220 of the first processing unit 190 may also be coupled to the bus 250. The second processing unit 200 and the second devices 230, 240 of the second processing unit 200 may also be coupled to the bus 250. The present invention also contemplates that some couplings may be achieved via direct connection. In one embodiment, the first processing unit 190 may be directly coupled to the second processing unit 200 without the use of a bus (e.g., the bus 250). In another embodiment, the first devices 210, 220 and the second devices 230, 240 may be directly connected to the storage device 110.

In operation, a content stream may be received by the signal processing unit 100. The incoming content stream may be initially encrypted to secure content, for example, from a central content provider to a remote subscriber. The initial decryption may be accomplished by the first processing unit 190 or may be accomplished before the content is received by the first processing unit 190. The first processing unit 190 may receive the content via the bus 250. The first processing unit 190 may process the content. For example, the first processing unit 190 may provide the initial decryption or may parse and filter content. During the processing by the first processing unit 190, the first processing unit 190 may buffer information in the storage device 110. Information to be buffered in the storage device 110 may first be secured via the first device 210. The first device 210 may, for example, encrypt, copy protect or degrade the information before sending the secured information to the storage device 110 via the bus 250 and the connection 140. Secured information stored in the storage device 110 may also be read by the first processing unit 190. The first device 220 may receive the secured information from the storage device 110 via the connection 140 and the bus 250 and may recover the information from the secured information. The first device 220, for example, may decrypt encrypted information or may remove copy protection from the copy protected information or may enhance degraded information. When the processing is complete, the first processing unit 190 may pass the information directly to the second processing unit via the bus 250. Alternatively, when the processing is completed, the first processing unit 190 may buffer the information in the storage device 110 after securing the information via the first device 210. The buffered and secured information stored in the storage device 110 may first pass through the second device 240 of the second processing unit 200 in which the information is recovered from the secured information. Whether the information is passed directly from the first processing unit 190 to the second processing unit 200 or the information is recovered from secured information from the storage device 110 via the second device 240, the second processing unit 200 may then process the information. In one embodiment, the second processing unit 200 may provide video and/or audio decoding. As described above, intermediate processing steps of the second processing unit 200 may employ the storage device 110 as a buffer. The information to be buffered may be secured via the second device 230 and may be stored in the storage device 110 via the bus 250 and the connection 140. The buffered information may later be read by the second processing unit 200 via the connection 140, the bus 250 and the second device 240. The second device 240 recovering the information from the buffered, secured information. Thus, in one embodiment, the content passed via the connection 140 or stored in the storage device 110 is secured.

Although each of the devices 210, 230 may use the same security scheme and each the devices 220, 240 may use the same scheme to recover content from the secured information, the present invention also contemplates that different security schemes can be used. The selection of security schemes may be preset or may be based upon, for example, content type, content rate, origin of content or destination of content. For example, content originating from the first processing unit 190 may use a particular form of encryption while content originating from the second processing unit 200 may use a different form of encryption. Thus, the devices 220, 240 may be adapted to know from which processing unit the secure content is coming. The content stream may be enhanced to include such origination information.

Figure 5:
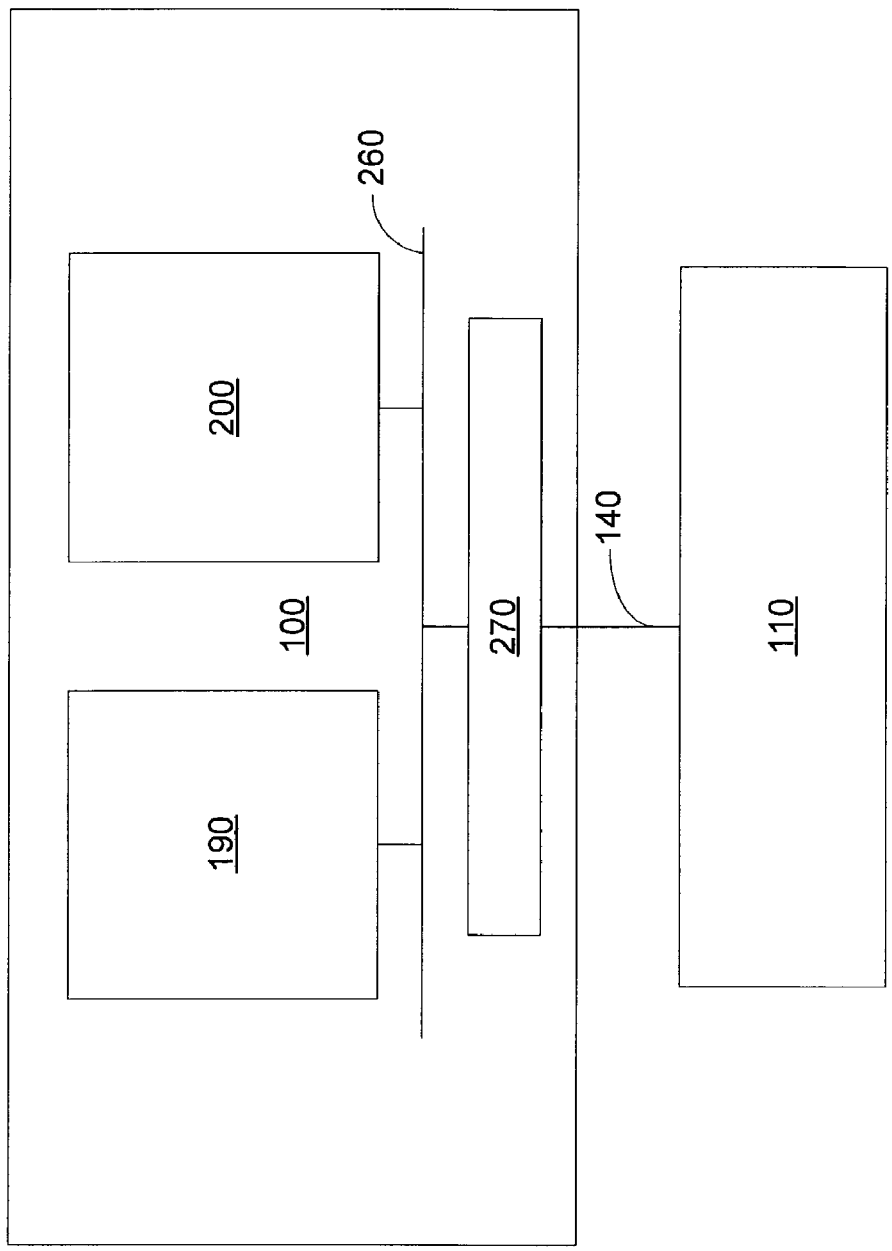
FIG. 5 shows a block diagram illustrating an embodiment of a system that securely buffers content according to the present information.

FIG. 5 shows a block diagram illustrating an embodiment of a system that securely buffers content according to the present information. The system may include, for example, the signal processing unit 100 and the storage device 110. Although the storage device 110 is illustrated as being external to the signal processing unit 100, as described above, the present invention also contemplates that signal processing unit 100 may include the storage device 110. The signal processing unit 100 may include, for example, the first processing unit 190, the second processing unit 200, a bus 260 and a security device 270. Although illustrated as two processing units, the signal processing unit 100 may include more or less than two processing units. The first processing unit 190 and the second processing unit 200 may be coupled to the bus 260 which, in turn, may be coupled to the security device 270. The security device 270 may be coupled to the storage device 110 via the connection 140.

The security device 270 may perform a plurality of tasks and functions and may accomplish them in parallel or in series. For example, the security device 270 may be adapted to secure content sent from the processing units 190, 200 to the storage device 110. In addition, the security device 270 may be adapted to recover content from secured content received from the storage device 110. In addition, the security device 270 may include, for example, a direct memory access (DMA) engine. Thus, content buffered by the processing unit 190, 200 during processing may be directly stored in the appropriate storage locations in the storage device 110. Furthermore, buffered content may be read directly from the storage device 110 and, after the content is recovered from the secured content, may be forwarded to the appropriate processing unit 190, 200.

In operation, content processed by the first processing unit 190 or the second processing unit 200 may be buffered in the storage device 110. The content to be buffered may be received by the security device 270 which may secure the content before using the DMA engine to write the secured content to a particular storage location in the storage device 110. The type of security applied to the content may depend upon, for example, content type, content rate, source processing unit or destination processing unit. If the first processing unit 190 or the second processing unit 200 needs buffered content, then a read request may be sent to the security device 270. The security device 270 may then read the particular storage location of the storage device 110. The security device 270 may then receive the secured content and may recover the content from the received secured content before forwarding the content to the requesting processing unit.

Figure 6:
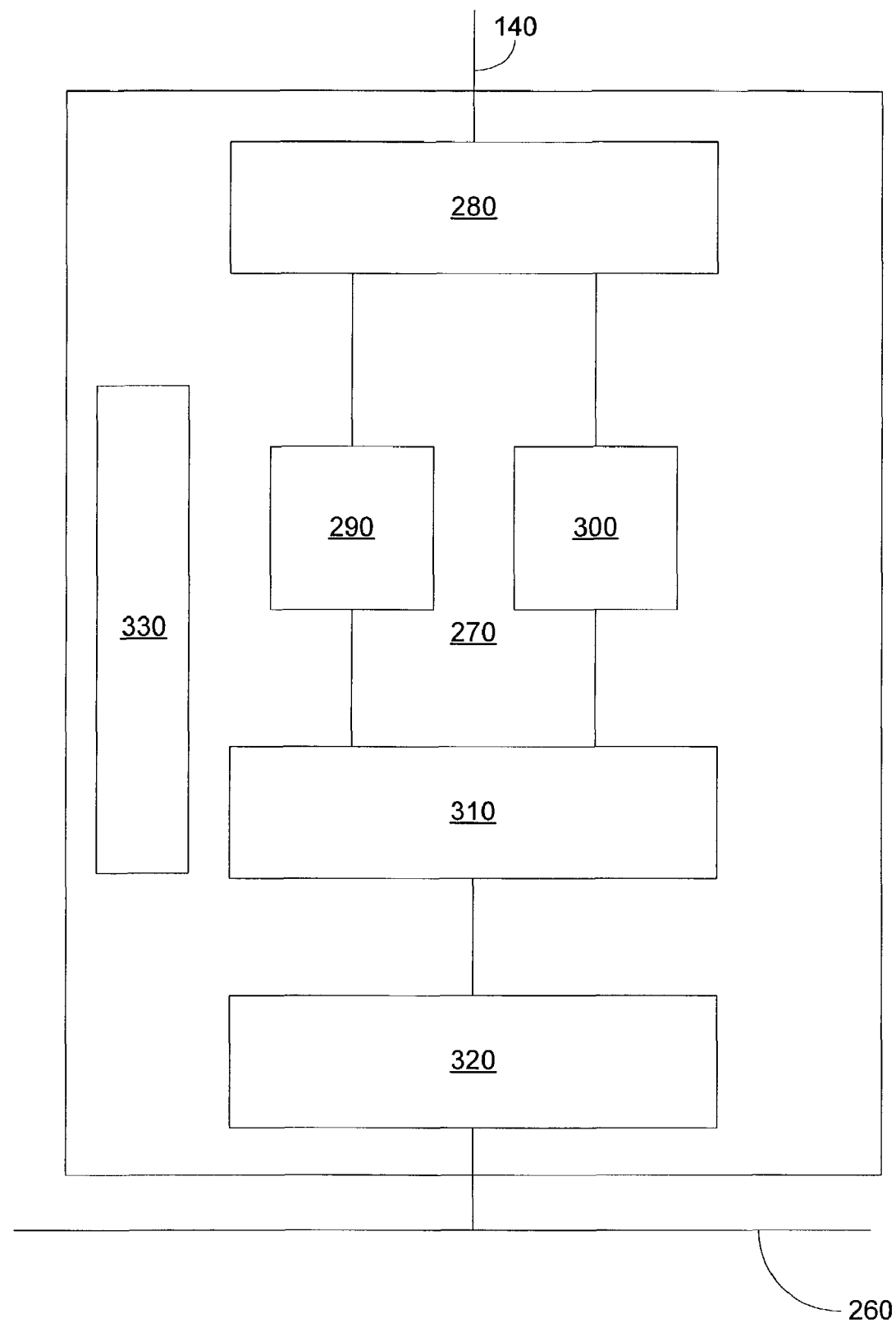
FIG. 6 shows a block diagram of an embodiment of a security device according to the present invention.

FIG. 6 shows a block diagram of an embodiment of a security device according to the present invention. The security device 270 may include, for example, a storage interface 280, a security engine 290, a recovery engine 300, a buffer 310, a bus interface 320 and a controller 330. The bus 260 may be coupled to the bus interface 320 which, in turn, may be coupled to the buffer 310. The buffer 310 may be coupled to the security engine 290 and to the recovery engine 300. The security engine 290 and the recovery engine 300 may be coupled to the storage interface 280. Although not explicitly shown, the controller 330 may be coupled with each of the components of the security device 270.

In operation, the controller 330 of the security device 270 may receive a write request. Content that is to be buffered in the storage device 110 may pass from the bus 260 to the bus interface 320. The content may then be stored in the buffer 310. The security engine 290 may receive content from the buffer 310 and may secure the content. The security engine 290 may, for example, encrypt the content, copy protect the content or degrade the content. The secured data may then be passed on to the storage interface 280. The controller 330 may also provide storage control (e.g., direct memory access) by writing the secured data in a particular location in the storage device 110.

The controller 330 of the security device 270 may also receive a read request. Content that is needed by the signal processing unit 100 may be read using the controller 330. The secured content may be received by the storage interface 280 via the connection 140. The secured content may be passed to the recovery engine 300. The recovery engine 300 may recover content from the received secured content. The recovery engine 300 may, for example, decrypt encrypted content, recover content from copy protected content, or recover content from degraded content. The recovered content may be buffered in the buffer 310 before being sent to the appropriate processing unit in the signal processing unit 100 via the bus interface 320 and the bus 260.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for securely buffering content, comprising:
   a signal processor; and
   a memory coupled to the signal processor,
   wherein the memory and the signal processor are part of an integrated chip,
   wherein the signal processor is configured to decrypt, to parse, to filter and to decode content,
   wherein, before the content leaves the signal processor for the memory, the signal processor secures the content during intermediate stages of processing,
   wherein, after the secured content enters the signal processor from the memory, the signal processor recovers the content from the secured content,
   wherein the signal processor is configured to use encryption if an output signal of the signal processor is digital and is configured to degrade signal resolution if the output signal of the signal processor is analog,
   wherein the signal processor is configured to degrade video content by degrading I-frames in the video content to satisfy a particular threshold level,
   wherein the signal processor comprises a first processor and a second processor, the first processor being coupled to the second processor,
   wherein the first processor comprises a transport processor,
   wherein the second processor comprises a video decoder,
   wherein, before the content leaves the transport processor for the memory, the transport processor secures the content, and
   wherein, after the video decoder receives the content secured by the transport processor, the video decoder recovers the content from the secured content.

2. The system according to claim 1, wherein the signal processor provides copy protection to the content stored in the memory or to the content transported between the signal processor and the memory.

3. The system according to claim 1, wherein, if the system outputs an analog signal, then the system degrades the analog signal.

4. The system according to claim 1, wherein, if the system outputs an analog signal, then the system applies a watermark is to the analog signal.

5. The system according to claim 1, wherein a first content rate of the first processor determines the type of encryption and/or decryption scheme used by the first processor.

6. The system according to claim 5, wherein a second content rate of the second processor determines the type of encryption and/or decryption scheme used by the second processor.

7. The system according to claim 1,
   wherein the first processor comprises an encryptor, and
   wherein the second processor comprises a decryptor that is capable of decrypting the content that has been encrypted by the encryptor.

8. The system according to claim 1,
   wherein the signal processor comprises a security block that is coupled to the first processor, to the second processor and to the memory, and
   wherein the security block secures the content transported from the first processor or the second processor to the memory.

9. The system according to claim 8, wherein the security block encrypts the content transported from the first processor or the second processor to the memory.

10. The system according to claim 9, wherein the security block decrypts the encrypted content received by the signal processor from the memory.

11. The system according to claim 10, wherein the security block decrypts the encrypted content transported from the memory to the first processor or the second processor.

12. The system according to claim 1,
   wherein the signal processor uses one or more security schemes based upon from which of the one or more processors the content originates.

13. The system according to claim 12, wherein the one or more security schemes comprise one or more copy protection schemes, one or more types of encryption or one or more content degradation schemes.

14. The system according to claim 1,
wherein the signal processor comprises one or more processors and a security block, the one or more processors being coupled to the security block, and
wherein the security block uses one or more security schemes based upon from which of the one or more processors the content originates.

15. The system according to claim 14, wherein the one or more security schemes comprise one or more copy protection schemes, one or more types of encryption or one or more content degradation schemes.

16. A method for securely buffering content in one or more devices, comprising: providing a signal processor and a storage device on a single integrated chip; applying, by the signal processor, a particular security scheme to protect content before the content leaves the signal processor for the storage device; and
recovering, by the signal processor, the content from the protected content after the protected content enters the signal processor from the storage device,
wherein applying the particular security scheme comprises applying a particular content degradation scheme if an output of the signal processor is an analog signal to protect the analog signal from copying and applying a particular encryption scheme if the output of the signal processor is a digital signal,
wherein the signal processor is configured to select security schemes based on a content rate and a content type, and
wherein the signal processor is configured to degrade content by degrading I-frames to satisfy a particular threshold level,
and wherein the signal processor is configured to use encryption if an output signal of the signal processor is digital and is configured to degrade signal resolution if the output signal of the signal processor is analog.

17. The method according to claim 16, wherein applying the particular security scheme comprises applying a particular encryption scheme and/or applying a particular copy protection scheme.

18. The method according to claim 16, wherein a proportion of degradation is based on a particular threshold level.

19. The method according to claim 16, wherein if the output is an analog signal then a watermark is applied to the analog signal.

20. The method according to claim 16, wherein the particular content degradation scheme comprises removing portions of the content.

21. The method according to claim 16,
wherein the signal processor comprises at least two processors, and
wherein the particular security scheme applied is based upon from which of the processors the content originated.

22. A method for securely buffering content in one or more devices, comprising: decrypting content received by a first processor of a signal processor, the decrypting being performed by a first device adapted to decrypt a first kind of encryption, wherein the first processor is configured to decrypt, to parse and to filter the content;
encrypting the content sent from the first processor to a memory before the content leaves the signal processor, the encrypting being performed by a second device adapted to perform a second kind of encryption, the second kind of encryption being different form from the first kind of encryption, wherein the encrypted content sent to the memory is facilitated by a direct memory access engine; and
decrypting the content received by a second processor of the signal processor from the memory after the content is received by the signal processor, the decrypting being performed by a third device adapted to decrypt the second kind of encryption,
wherein the first processor is configured to select security schemes based on origin of content,
wherein the second processor is configured to select security schemes based on origin of content, and
wherein the content comprises video content and the signal processor is configured to degrade the video content by degrading I-frames of the video content,
and wherein the signal processor is configured to use encryption if an output signal of the signal processor is digital and is configured to degrade signal resolution if the output signal of the signal processor is analog.

23. The method according to claim 22, further comprising:
encrypting the content sent from the second processor to the memory before the content leaves the signal processor, the encrypting being performed by a fourth device adapted to perform a third kind of encryption.

24. The method according to claim 23, wherein the second kind of encryption is different in kind from the third kind of encryption.

25. The method according to claim 23, wherein the signal processor comprises a security block, the security block comprising the second device, the third device and the fourth device.

26. The method according to claim 23, wherein the third device is also adapted to decrypt the third kind of encryption.

27. The method according to claim 23, wherein the second processor comprises the third device and the fourth device.

28. The method according to claim 22, wherein the signal processor comprises a security block, the security block comprising the second device and the third device.

29. The method according to claim 22, wherein the first processor comprises the first device and the second device.

* * * * *

UNITED STATES PATENT AND TRADEMARK OFFICE
CERTIFICATE OF CORRECTION

| | | |
|---|---|---|
| PATENT NO. | : 7,797,550 B2 | Page 1 of 1 |
| APPLICATION NO. | : 10/310075 | |
| DATED | : September 14, 2010 | |
| INVENTOR(S) | : Jeffrey Douglas Carr | |

It is certified that error appears in the above-identified patent and that said Letters Patent is hereby corrected as shown below:

Column 10, line 11 delete "form".

Signed and Sealed this
Fourteenth Day of June, 2011

David J. Kappos
*Director of the United States Patent and Trademark Office*